Sept. 12, 1961 J. L. METZ 2,999,906
MAGNETIC RECORDER HEAD
Filed Dec. 19, 1957
FIG. 1.
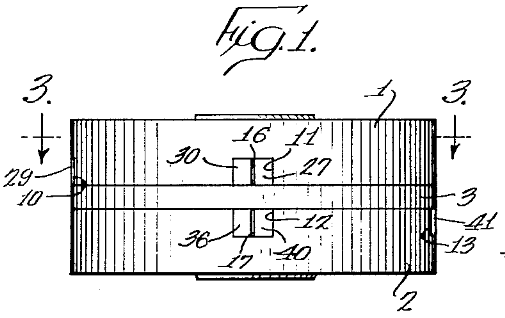
FIG. 2.
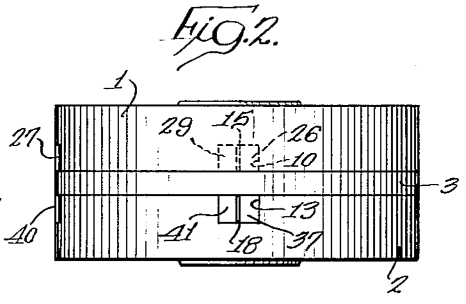
FIG. 3.
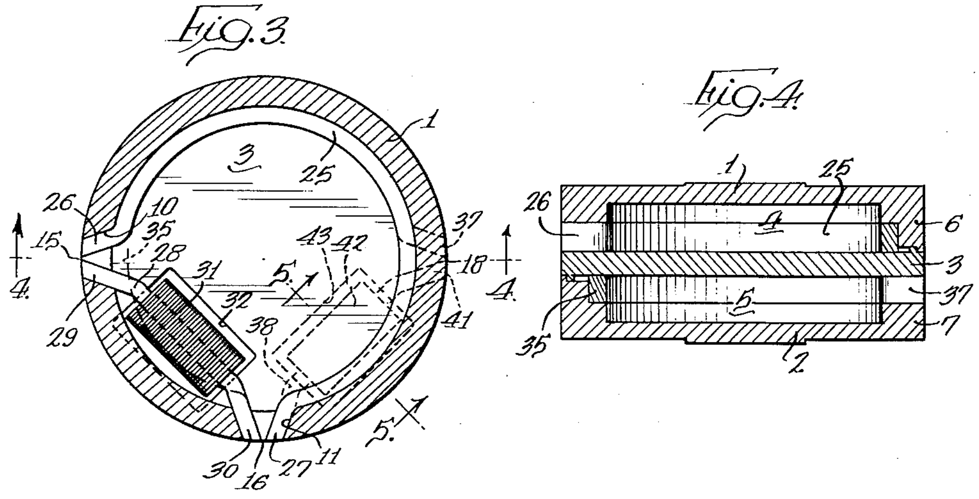
FIG. 3, FIG. 4.
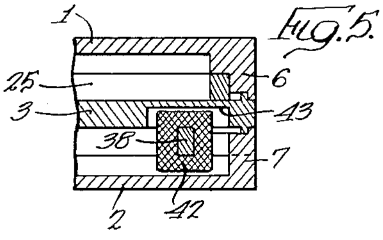
FIG. 5.
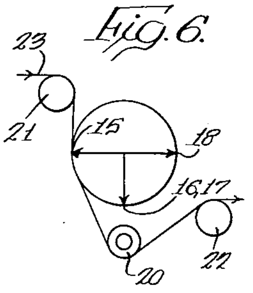
FIG. 6.
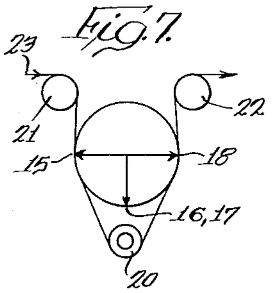
FIG. 7.
FIG. 8.
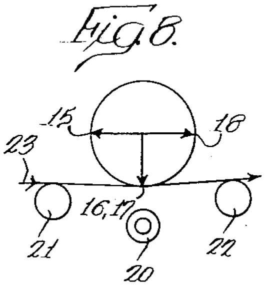
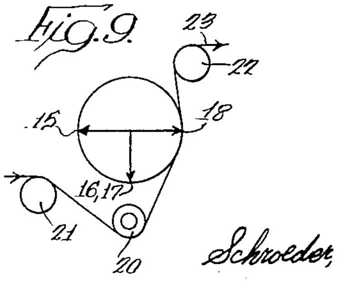
FIG. 9.
INVENTOR.
Jack L. Metz
BY
Schroeder, Hofgren, Brady & Wegner
Attys.

United States Patent Office 2,999,906
Patented Sept. 12, 1961

2,999,906
MAGNETIC RECORDER HEAD

Jack L. Metz, Chicago, Ill., assignor to Warwick Manufacturing Corporation, a corporation of Delaware Filed Dec. 19, 1957, Ser. No. 703,864
8 Claims. (Cl. 179—100.2)

This invention relates to a magnetic recorder head and more particularly to a head for recording, reproducing or erasing a recording medium and capable of use with a plurality of different recording systems.

An object of this invention is to provide a new and improved magnetic recorder head having quadruple functions and more particularly being usable with the following sound recording systems: American Monaural, European Monaural, stacked binaural or stereophonic and staggered binaural or stereophonic as well as other multi-track recording systems.

Other objects of the invention are to provide a magnetic recorder head having means including a pair of gaps spaced apart about the periphery of the head and at different levels for individual operation one with each of recording medium lanes at different heights relative to the head without cross-talk due to gap coupling or for staggered multi-track operation; and to provide such a head additionally with means including a pair of gaps one above the other for stacked multi-track operation.

A further object of the invention is to provide a head as defined in the preceding paragraph wherein a first core and coil have one of the stacked gaps and one of said other gaps and a second core and coil have the remaining gaps and the coils are positioned substantially at right angles to each other to minimize cross-talk between the coils.

Further objects and advantages will become apparent from the following detailed description taken in connection with the accompanying drawings in which:

FIG. 1 is a front elevational view of the magnetic recorder head;

FIG. 2 is a side elevational view of the magnetic recorder head looking toward the right of FIG. 1;

FIG. 3 is a plan section through the head taken generally along the line 3—3 in FIG. 1;

FIG. 4 is a vertical section taken generally along the line 4—4 in FIG. 3;

FIG. 5 is a fragmentary vertical section taken generally along the line 5—5 in FIG. 3;

FIG. 6 is a diagrammatic view showing the head and recording medium arranged for American monaural operation;

FIG. 7 is a view similar to FIG. 6 showing the head and recording medium arranged for a multi-track operation such as staggered binaural or stereophonic operation;

FIG. 8 is a diagrammatic view showing the head and recording medium arranged for a multi-track operation such as stacked binaural or stereophonic operation; and FIG. 9 is a diagrammatic view of the head and recording medium arranged for European monaural operation.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the invention to the embodiment illustrated. The scope of the invention will be pointed out in the appended claims.

As shown in the figures of the drawings, the magnetic recorder head has an upper casing part 1 and a lower casing part 2 separated by a spacer 3 and the casing parts are formed with internal cavities 4 and 5 and annular rims 6 and 7, respectively. The casing parts 1 and 2 are generally similar and the part 1 is inverted so as to have rims 6 and 7 in engagement with the spacer 3. The foregoing parts are made of a suitable material, such as Mumetal. The spacer 3 is made of a suitable material which may be a plastic.

As shown in FIGS. 1 and 2, the casing is formed with openings 10, 11, 12 and 13, each of which expose a pole piece gap for engagement with a recording medium such as a magnetic tape or the like. These gaps are indicated at 15, 16, 17 and 18.

The head with the gaps as arranged in the drawings has a plurality of functions, in that the head may be used with four different systems of sound recording. The head may also be used with other systems of recording. The four different systems of sound recording are shown in FIGS. 6–9 and the use of the head will be explained by reference thereto. A fixed guide roller 20 and a pair of movable guide rollers 21 and 22 are associated with a recording medium 23, such as a magnetic tape or the like, and with the movable guide rollers 21 and 22 positioned as shown in FIG. 6, the recording medium passes in engagement with the gap 15 to provide for American monaural operation in which the medium 23 is at its highest elevation relative to the head of a plural lane tape with the upper lane is in contact with the gap.

With the guide rollers 21 and 22 arranged in association with the medium 23 as shown in FIG. 7, the gaps 15 and 18 are in engagement with the medium 23 at different levels so as to operate in staggered multi-track binaural or stereophonic operation with the gaps 15 and 18 spaced apart an appropriate distance to take into account the longitudinal separation between related parts of recording on the medium 23.

With the guide rollers 21 and 22 positioned as shown in FIG. 8, and with the medium 23 out of contact with the guide roller 20, the tape contacts the stacked gaps 16 and 17 to provide for stacked multi-track binaural or stereophonic operation.

With the guide rollers 21 and 22 arranged as shown in FIG. 9, the tape 23 is arranged to engage only the gap 18 at a level beneath the gap 15 to operate in European monaural operation. With a two lane tape, this places the lower lane in operative relation to the gap.

In all of the operations described with respect to FIGS. 6–9, the head may function either as a recording head, a reproducing head, or an erasing head.

The structure providing the gaps for the head is shown wherein a first core is located above the spacer 3 and has a first generally C-shaped part 25 terminating in pole pieces 26 and 27 positioned in casing openings 10 and 11 respectively. The core has a second part 28 substantially bridging the gap between the pole pieces 26 and 27 and at its ends has pole pieces 29 and 30 coacting with the pole pieces 26 and 27 respectively to form the gaps 15 and 16. A coil 31 is wound around the core part 28 and may extend within a suitable recess 32 formed in the spacer 3.

A second core positioned beneath the spacer 3 has a first generally C-shaped part 35 terminating in pole pieces 36 and 37 and a second core part 38 substantially bridges the gap between the pole pieces 36 and 37 and has pole pieces 40 and 41 associated with the pole pieces 36 and 37 to form the gaps 17 and 18 respectively. A coil 42 surrounds the core part 38 of the second core and fits within a recess 43 formed in the spacer 3.

The core parts are formed of Mumetal or other suitable material, and are suitably held in place by the casing or may be secured together by use of a suitable plastic material. The coil 31 is associated with the magnetic gaps 15 and 16 while the coil 42 is associated with the magnetic gaps 17 and 18 so that gaps 15 and 18 are independent of each other for their respective monaural operations as described in FIGS. 6 and 9 or may be used in a staggered multi-track operation as described in FIG. 7. The gaps 15 and 18 by being spaced about the periphery of the head eliminate any possibility of cross-talk therebetween due to magnetic coupling between the gaps. The stacked gaps 16 and 17 are independent of each other and may be used in the stacked multi-track operation disclosed in FIG. 8.

The head structure disclosed herein enables the coils 31 and 42 to be arranged generally at right angles to minimize cross coupling between the coils and one coil opposes the other to cancel out "hum."

I claim:

1. A unitary magnetic recorder head comprising, a casing including a pair of members each having an internal cavity and an annular rim with one member inverted and positioned above the other, a spacer disposed between said members, a first core positioned within the casing at one side of the spacer having a generally C-shaped first part with pole pieces at its ends and a second part substantially bridging the ends of the first part with a gap having pole pieces formed between the adjacent ends of the parts, a coil around one of said first core parts, a second core positioned within the casing on the other side of the spacer having a generally C-shaped first part with pole pieces at its ends and a second part substantially bridging the ends of the first part with a gap having pole pieces formed between the adjacent ends of the parts, a second coil around one of said second core parts, the two cores being rotatably oriented relative to each other to have a gap of one stacked above a gap of the other and the remaining gap of each core on opposite sides of the stacked gaps, and means defining openings in the casing to expose the gaps to the outside of the casing.

2. A magnetic recorder head comprising, a first core having a generally C-shaped first part and a second part between the ends of the first part with a gap formed between adjacent ends of the parts, a coil around one of said first core parts, and a second core having a generally C-shaped first part and a second part between the ends of the first part with a gap formed between adjacent ends of the parts, a second coil around one of said second core parts, the two cores being rotatably oriented relative to each other to have a gap of one stacked above a gap of the other and the remaining gap of each core on opposite sides of the stacked gaps.

3. A unitary magnetic recorder head comprising, a first core having an elongated first part and a second elongated part between the ends of the first part with a pair of gaps formed one each between adjacent ends of the parts, a coil around one of said first core parts, and a second core having an elongated first part and a second elongated part between the ends of the first part with a pair of gaps formed one each between adjacent ends of the parts, a second coil around one of said second core parts, the two cores being rotatably oriented relative to each other to have a gap of one stacked above a gap of the other and the remaining gap of each core on opposite sides of the stacked gaps and the coils arranged generally at right angles to each other.

4. A magnetic recorder head comprising, a first core having a pair of gaps at the same level and spaced apart from each other, a first coil associated with said core, a second core having a pair of gaps at the same level and spaced apart from each other, a second coil associated with said second core, and means for holding said cores in assembled relation with one above the other and offset to have a gap from each core disposed one above the other and the other gap from each core at opposite sides of the stacked gaps relative to each other and spaced apart a distance to compensate for the longitudinal separation between related parts of a multi-lane recording medium.

5. A unitary magnetic recorder head comprising, a casing, means defining a pair of independent gaps spaced apart about the periphery of the casing and at different levels for individual association one with each of recording medium lanes at different heights relative to the head, means defining a second pair of gaps positioned one above the other, and a pair of coils extending generally at right angles to each other, each coil being associated with two gaps including one from each pair of gaps.

6. A unitary magnetic recorder head comprising, a casing, means providing a pair of independent pole piece gaps spaced apart about the periphery of the casing and at different levels for individual association each with recording medium lanes at different heights relative to the casing for independent monaural operation or staggered simultaneous operation with two lanes of a recording medium, and means providing a pair of pole piece gaps one above the other for stacked simultaneous operation with two lanes of a recording medium.

7. A magnetic recorder head for use in monaural, binaural or stereophonic operations and other multi-track operations comprising, a casing, means defining a pair of pole piece gaps spaced apart about the periphery of the casing and at different levels for individual association one with each of recording medium lanes at different heights relative to the head for individual monaural operation or staggered multi-track operation, and means defining a pair of pole piece gaps one above the other for stacked multi-track operation.

8. A unitary magnetic recorder head comprising, a casing, means providing a pair of independent pole piece gaps spaced apart about the periphery of the casing and at different levels for individual association each with recording medium lanes at different heights relative to the casing for independent monaural operation or staggered simultaneous operation without cross-talk due to gap coupling and at least a pair of coils associated one with each of said gaps.

References Cited in the file of this patent

UNITED STATES PATENTS

| | | |
|---|---|---|
| 2,524,063 | Masterson | Oct. 3, 1950 |
| 2,675,429 | Rohling | Apr. 13, 1954 |
| 2,745,905 | Bobb | May 15, 1956 |
| 2,793,253 | Howey | May 21, 1957 |
| 2,831,069 | Snow | Apr. 15, 1958 |

FOREIGN PATENTS

| | | |
|---|---|---|
| 173,869 | Austria | Feb. 10, 1953 |